United States Patent [19]
Hügenell

[11] Patent Number: 4,822,156
[45] Date of Patent: Apr. 18, 1989

[54] REFLECTING TELESCOPE

[76] Inventor: Hermann Hügenell, Maxdorfer Str. 47, D-6715 Lamb sheim, Fed. Rep. of Germany

[21] Appl. No.: 922,180

[22] Filed: Oct. 22, 1986

[30] Foreign Application Priority Data

Oct. 23, 1985 [DE] Fed. Rep. of Germany ....... 3538208

[51] Int. Cl.$^4$ .................. G02B 17/06; G02B 7/18; G02B 23/06; G02B 23/16
[52] U.S. Cl. .................. 350/613; 350/504; 350/319
[58] Field of Search ............. 350/613, 616, 503, 504, 350/505, 632, 319

[56] References Cited
U.S. PATENT DOCUMENTS 3,502,387 3/1970 Hadley ....................... 350/613

Primary Examiner—Jon W. Henry
Attorney, Agent, or Firm—McGlew and Tuttle

[57] ABSTRACT

A reflecting telescope according to the invention includes a tube having an inlet and a primary mirror end. A plurality of mirror segments cooperate to form a single mirror of a single paraboloid-shaped surface by grinding the mirror segments all together in a single grinding process. This mirror is then positioned at the primary mirror end of the tube. Each of the plurality of mirror segments has a circular disk shape and is arranged in one of circular tracks, each circular track being defined by an inner circle and an outer circle with each inner and outer circle being concentric to the tube central axis. The areas free of mirror segments lie between the mirror segments of circular disk shape and an innermost area free of mirror segments lies within an innermost circular track. Bearings are positioned about each of the mirror segments at the areas free of mirror segments for adjustment of the mirror segments. A system of mounting bars is positioned and connected to the primary mirror end at the areas free of mirror segments, such that light entering the inlet end causes shadows to be cast by the system of mounting bars on the areas free of mirror segments. A plurality of observation cages may be positioned in the innermost area free of segments posed to be positionable between the mirror end and the inlet to provide different modes of observation. A deviation mirror may be provided for reflecting light which has been directed towards the observation cages.

1 Claim, 17 Drawing Sheets

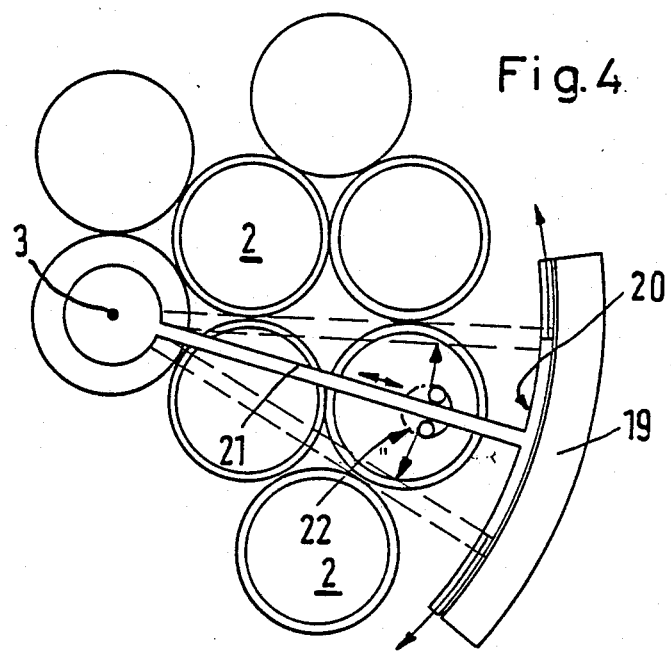
Fig. 4
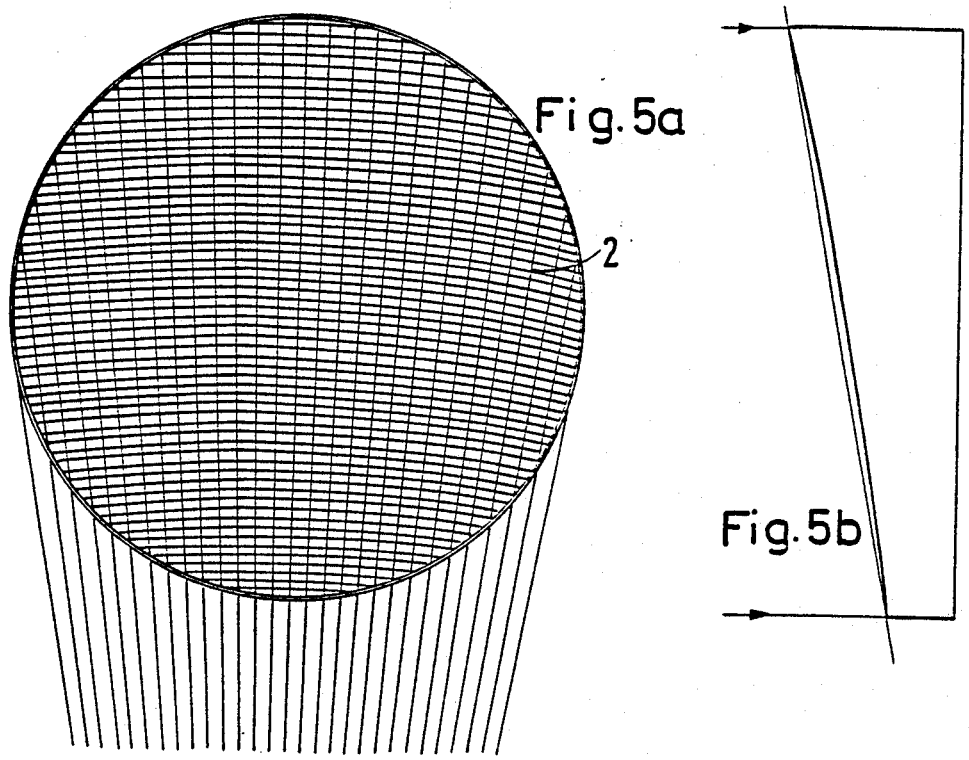
Fig. 5a
Fig. 5b

REFLECTING TELESCOPE

FIELD AND BACKGROUND OF THE INVENTION

The invention relates to a reflecting telescope with a primary mirror formed of individual, adjustably mounted mirror segments, with a tube positioned concentrically with respect to a primary mirror and equipped with observation cages, and with a system of mounting bars for the tube.

A reflecting telescope of this generic kind is exemplified by the Mauna Kea reflecting telescope with a reflecting diameter of 10 meters, which is still in the planning stage and is intended to be the largest reflecting telescope in the world to date (*Sterne und Weltraum* [Stars and Space], 1984, 8 to 9, p. 412). In that reflecting telescope, the primary mirror is formed of 36 hexagonal mirror segments that form the surface of the mirror in a honeycomb arrangement, with one mirror segment left open in the middle for observation in Cassegrain focus. The fabrication of the individual hexagonal mirror segments alone is highly problematic. The latter are off-axis sections of a paraboloid that must be cut with six corners. Production starts with a circular blank that is deformed by precisely defined shearing and bending forces applied to the edge. A spherical shape is ground into the deformed blank. The forces applied are then again removed. If the forces have been accurately chosen, the mirror segment when released takes on the desired shape of a paraboloid section. It has been found, however, that during cutting into the hexagonal shape warping may occur, so that the production of the different mirror segments is very costly. In addition, the position of the individual hexagonal mirror segments must be adjusted subsequently depending on the position of the telescope, wind load and temperature fluctuations. Hence, the support points of each mirror segment are connected with three position regulators that refocus the mirror segment and can be moved in two inclination directions. On the edges on the reverse side are sensors that measure the shifting of adjacent mirror plates with respect to one another. In conjunction with three inclination sensors that measure the total curvature of the mirror segment, they supply data that is processed in a computer system that controls all 108 position regulators. With a total of 168 different sensors, the redundancy is so great that the failure of individual sensors can be coped with. At any rate, with this arrangement the fronts of the mirror segments are free of interfering control systems, but it is necessary on occasion to readjust it with the aid of a star configuration so that infra-red observations during the day are also possible. Sensors and position regulators must work accurately at least 50%.

In addition, one-piece primary mirrors for reflecting telescopes are known, such as the 3.5 meter telescope at the Max Planck Institute of Astronomy (*Zeiss Information* No. 94, 1982, pp. 4 ff). In that telescope, the mirror element is made of a glass ceramic Zerodur) with a low temperature expansion coefficient. The surface of the mirror is ground as a high order hyperboloid of revolution and polished. The standard deviation is 30 nm at most; measurement is done by laser interferometer. The mirror element is mounted on an 18-point bearing.

Such reflecting telescopes must meet the following requirements:

1. As much radiant energy as possible must be collected; this is proportional to the light-gathering surface of the primary mirror. It follows that the diameter of the primary mirror must be as large as possible. Diameter is limited, however, by technical and economic conditions.

2. The radiation picked up from a star should be concentrated as sharply as possible at a point within the focal plane of the reflecting telescope. The quality of the optical image should be as good as possible. Problems result with earth-bound reflecting telescopes from the influence of the earth's atmosphere, e.g., air turbulence. Reflecting telescopes on satellite orbits, however, do not experience these problems.

3. The star to be viewed should be held as long as possible within the image plane without position changes.

The disadvantage of using one-piece primary mirrors in reflecting telescopes is that because of reasons related to their production they are limited in diameter. The largest reflecting telescope with a one-piece primary mirror is the Hale telescope, which has a mirror diameter of 5 meters. However, the only reflecting telescope known to date with a primary mirror made up of individual mirror segments has the disadvantage that the production of the individual mirror segments is extremeLy costly, since each mirror segment must be ground by itself as a section of a paraboloid. Furthermore, the sensors on the lines where the individual segments touch must insure a precise adjustment. The expense thus involved in supplementary technical arrangements is extremely high in relation to the overall effectiveness of the telescope. In addition, a highly complex mounting system is required for the segments.

Both kinds of reflecting telescope suffer from the disadvantage that the observation cages situated inside the tube cast a shadow with their entire diameter over the reflecting surface of the primary mirror. At the same time, the mounting bars cast other shadows that extend to some extent radially over the primary mirror. These shadows occur and are unavoidable with all types of focusing. They bring it about that reflecting surfaces of the primary mirror that were produced at great cost are ineffective, because they cannot contribute to the collection of the radiation energy.

SUMMARY AND OBJECT OF THE INVENTION

It is an object of the invention to create a reflecting telescope of the general kind described at the outset with individual mirror segments and segment bearings that are easy and economic to assemble and produce and may be arranged so that shadows caused by the observation cages and the system of mounting bars of the tube are avoided.

To accomplish this object, the invention provides that the mirror segments are composed of mirror elements in the shape of circular discs and are mounted at intervals from one another on circular tracks running concentric to the tube in such a way that free areas are formed between the various mirror elements for the bearings of the mirror elements and for the system of mounting bars and their shadows. With the reflecting telescope pursuant to the invention, also referred to as a central axis reflector, the mounting bars are located outside the path of the rays and thus do not cast a shadow on any of the costly reflecting surfaces, while the central shadow cast by the observation cages is exploited in many ways to deflect the incident light.

The individual mirror segments in the central axis reflector are round mirrors, which avoid the difficult tension and compression relations that change depending on the inclination of the tube that are encountered with the state of the art hexagonal mirror segments. For round mirror elements, the question of mounting has long been technically mastered.

The invention is thus based on a combination of the use of round mirrors, which can be manufactured simply from a technical standpoint with conventional means and economically, as the mirror elements and the arrangement of the latter such that between the individual mirror elements free areas are created for the bearings of the mirror elements on the one hand and for the mounting bars and the shadows they cast on the other hand. Thus, in the production of the reflecting telescope pursuant to the invention, one can borrow from the known and mastered technology for producing a one-piece mirror element equipped with adjustable bearings, on the one hand. At the same time, the invention proposes arranging these single round mirror elements at intervals from one another on a circular track in such a way that the free spaces in between can be used as free areas for the bearings of the mirror element for one thing and for the mounting bars and their shadows for another.

To determine the diameter of the tube, which also represents the maximum diameter of the primary mirror, we start with the desired diameter of a one-piece or single-surface mirror. If, for example, an effective diameter of 20 meters is desired for the primary mirror, which is to be composed of 18 round mirror elements, the radius of an individual round mirror element is given by the following calculation:

$$18r^2 = 100$$

$$r = 2.357 \text{ m}.$$

Each of the 18 mirror elements thus has a diameter of 4.714 m. The overall dimater of the primary mirror made up of 18 round mirror elements is 26.946 m. In this instance, the free spaces between the 18 round mirror elements are to be treated like the corresponding shadowed areas of a hypothetical mono-mirror with a diameter of 26.946 m.

The invention further proposes that the surfaces of all mirror elements be ground all together to form the desired mirror surface, particularly a paraboloid; this may be done analogously to the grinding and polishing of a one-piece mirror according to the state of the art.

The invention also proposes that the incoming side of the mounting of the tube consist of a perforated plate with holes whose arrangement and diameter correspond to the arrangement and diameter of the mirror elements of the primary mirror.

The invention further comprises the design of a special system of mounting bars situated outside the path of radiation of the central axis reflector with observation cages that can move freely along the central axis. Pursuant to the invention the central axis reflector is provided with three observation cages equipped with various deflecting mirrors depending on the desired focus. All the observation cages can move freely along the central axis.

The invention is more closely explained below with reference to an embodiment of a reflecting telescope depicted in more detail in the drawings.

BRIEF DESCRIPTION OF THE DRAWINGS

In the drawings:

FIG. 4 is a simplified representation of the grinding process for the primary mirror formed of round mirror elements;

FIG. 5 is a depiction of an individual round mirror element;

DESCRIPTION OF THE PREFERRED EMBODIMENT

Figure 1:
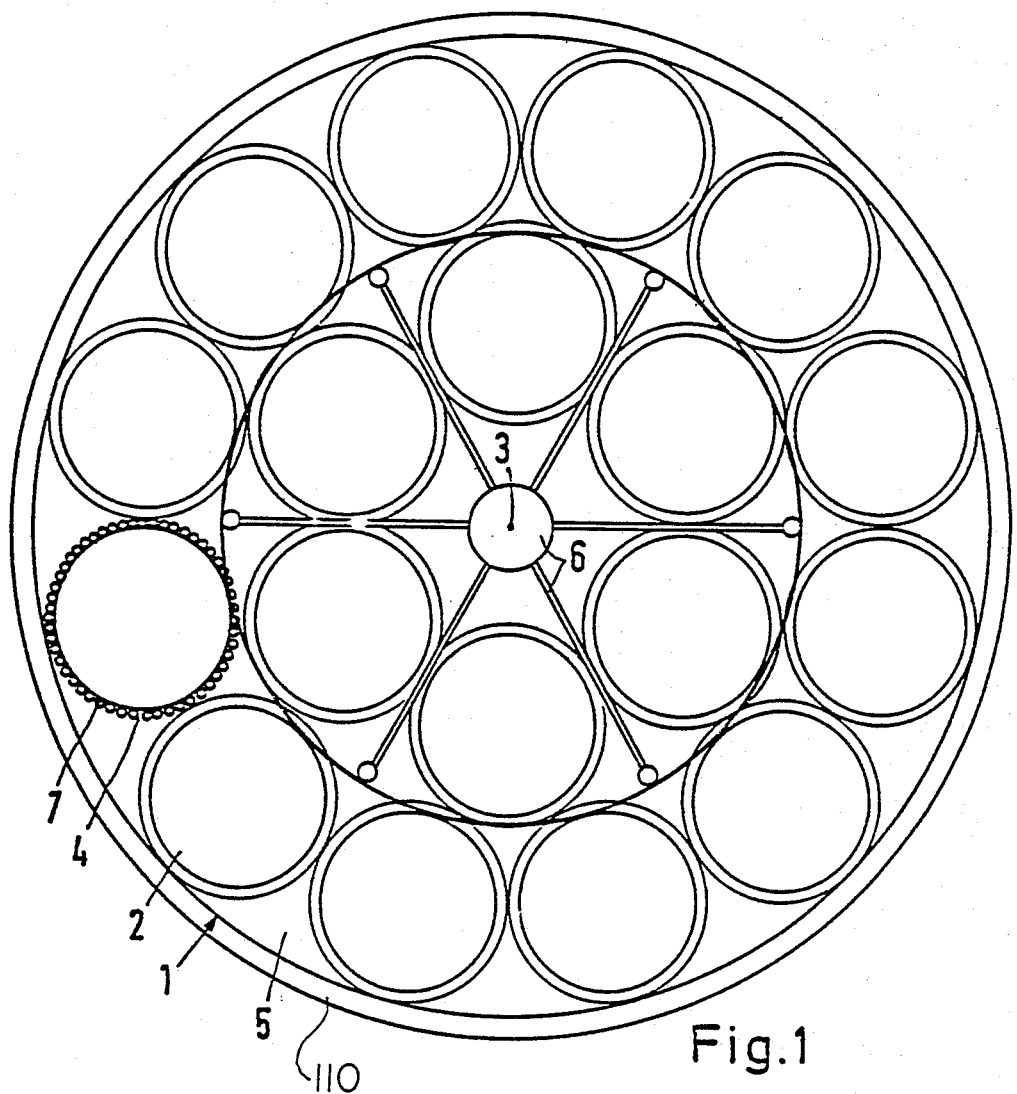
FIG. 1 is a top view of the primary mirror consisting of 18 round mirror elements and the mounting bars placed between them.

FIG. 1 shows a top view of the primary mirror 1 of the reflecting telescope consisting of 18 adjustably mounted mirror segments 2, each mirror segment 2 consisting of a round mirror element in the shape of a circular disc. The individual mirror elements 2 are mounted at intervals from one another on circular tracks that run concentric to the central axis 3 and tube 110, in such an arrangement that between the individual mirror segments 2 free areas 4 are created for the bearings 7 of the mirror elements 2 and free areas 5 are created for a system of mounting bars 6 and for the shadows they cast.

Each mirror element 2 consists of a one-piece round mirror whose entire surface has been ground without leaving a central hole. Round mirrors of this kind, but with a central opening, are known to the art in terms of their production and mounting. As an example, the reader is referred to the description of the 3.5 meter telescope made by Zeiss for the Max Planck Institute of Astronomy in *Zeiss Information*, No. 94, November 1982, pp. 4 ff. A mirror element of this kind is surrounded by a mirror bearing 7 with radial tension-compression equilibrium, for which purpose balancing elements are provided on the circumference of the mirror element 2 in the free areas provided for them.

The outer diameter of the primary mirror 1 and hence the diameter of the tube is derived from the desired effective reflecting diameter of a hypothetical one-piece mirror. If the 18 individual mirror elements 2 are intended to replace a one-piece mirror 20 meters in diameter, the following calcuation is made:

Surface area of the one-piece mirror 20 m in diameter:

$$A^* = 100\pi = R^{*2}\pi$$

Central axis reflector with 18 mirrors:

$$18R^2\pi = 100\pi$$

$$18R^2 = 100$$

$$r = 2.357 m$$

Thus each of the 18 mirrors has a diameter of 4.71 m.

Figure 19:
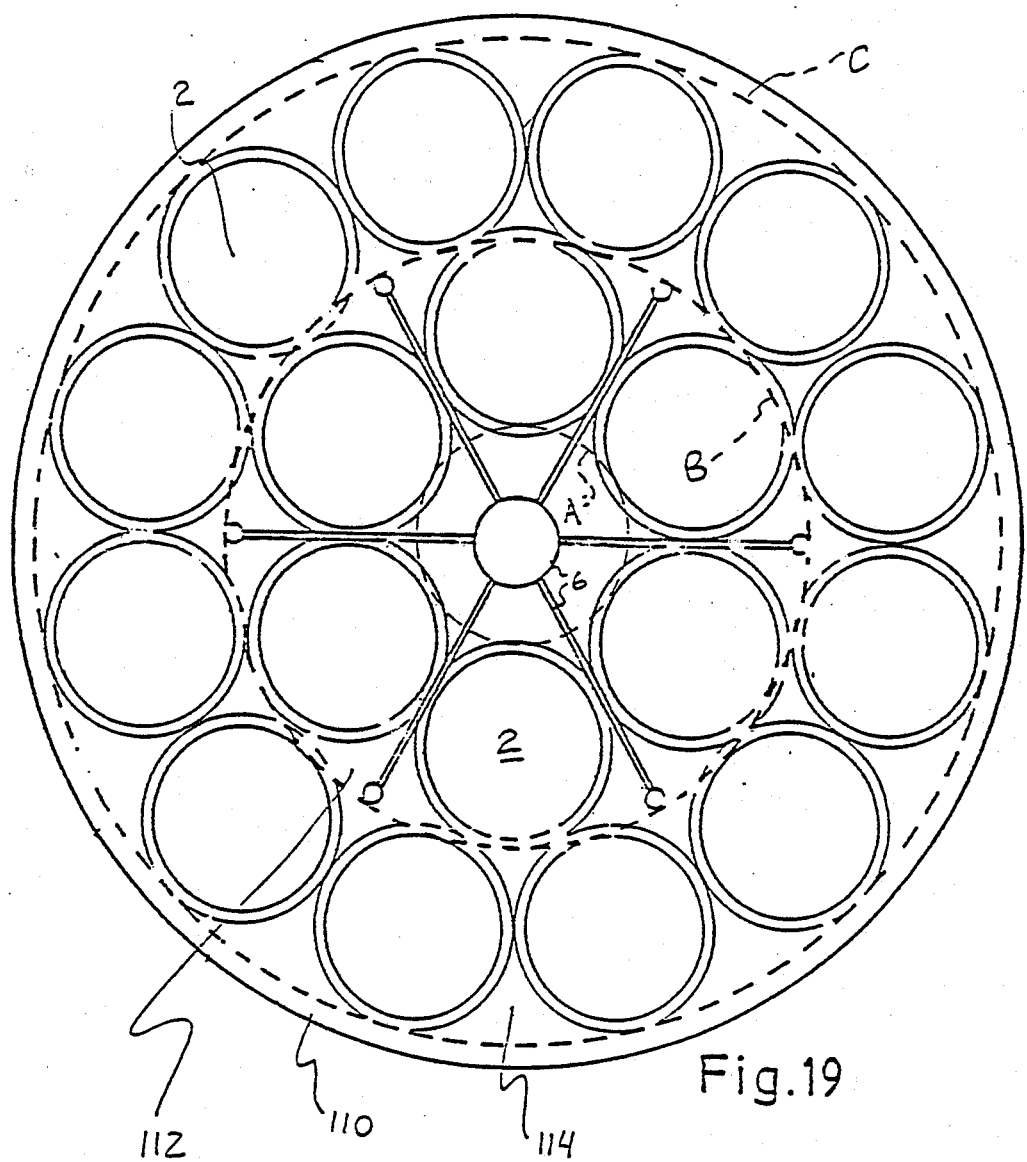
FIG. 19 is a top view showing the primary mirror in the manner similar to FIG. 1 and also showing the tracks within which the mirror segments are positioned.

By arranging the 18 mirror elements 2 of the above-mentioned diameter on two circular tracks radial to the central axis 3, the inner circular track 112 holding six mirror elements 2 and the outer circular track holding twelve mirror elements 2, we obtain an overall outer diameter for the primary mirror 1 and hence for the tube of 26.946 m. Inner circular track 112 runs between concentric circles A and B shown in FIG. 19. Outer circular track 114 runs between concentric circles B and C shown in FIG. 19. Tube 110 may either be a physical circular wall substantially coincident with circle C or it may be an imaginary outer boundary of the telescope substantially coincident with circle C.

The hypothetical one-piece mirror 20 meters in diameter and hence with a reflecting area of $A^* = 100\pi$ is thus replaced by 18 individual mirror elements 2 with the same total surface area. Because of the mirror mounting the diameter of the central axis reflector increases to a total of 26.946 m. In this instance the free spaces 4, 5 between the 18 mirror elements 2 are to be treated like the corresponding shadowed areas on a hypothetical one-piece mirror with a diameter of 26.946 m.

Figure 2:
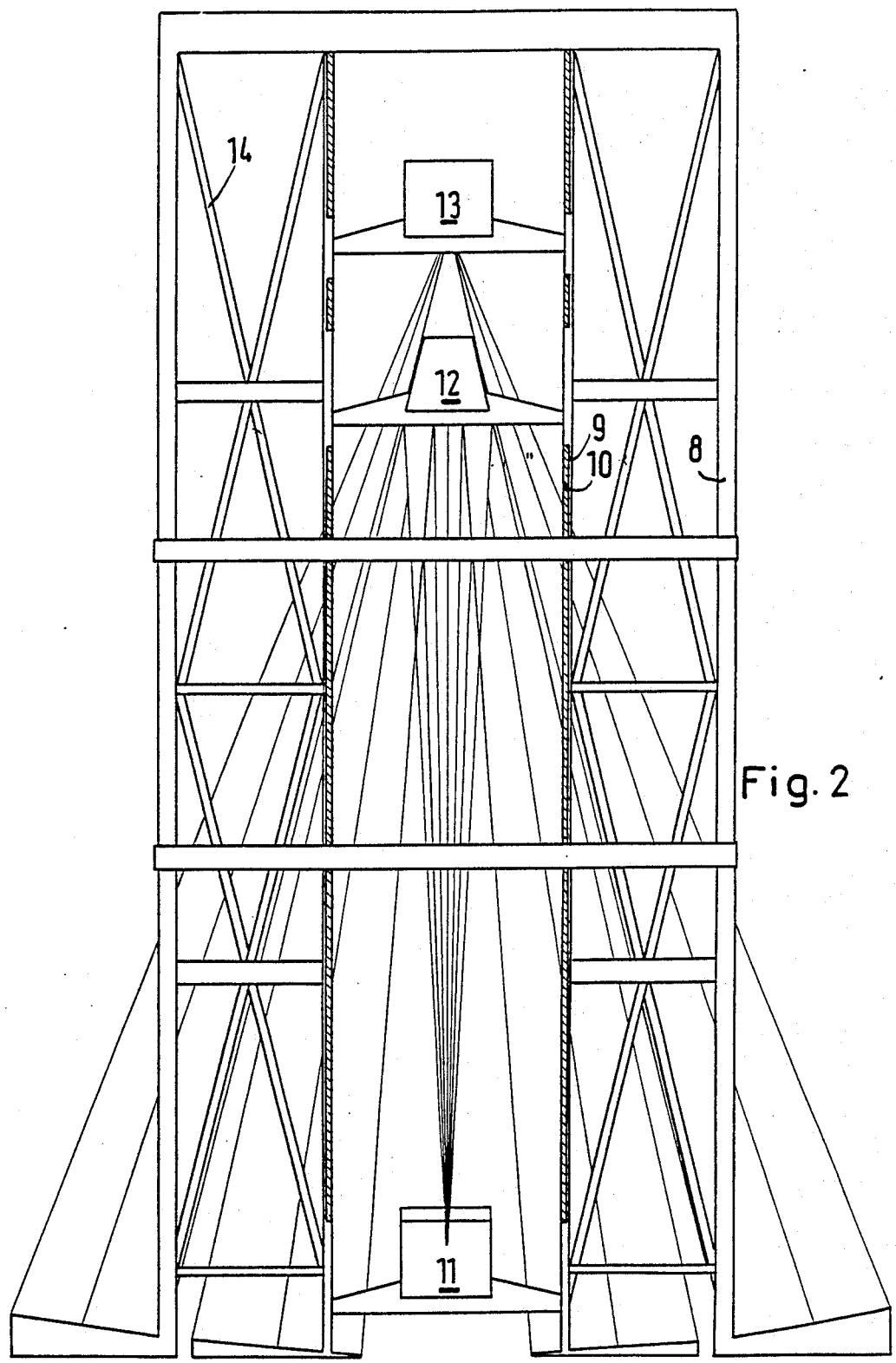
FIG. 2 is a simplified sectional view along the central axis of the primary mirror through the system of mounting bars with the three observation cages capable of travelling on them.

The system of mounting bars 6 of the primary mirror 1, parabolically shaped in a manner described in more detail below, is depicted in FIG. 2 in a simplified sectional view along the central axis 3. It comprises intermediate support pipes 8, that constitute a static load-carrying structure for the tube, and inner guide pipes 9, equipped with guide rails 10 for guiding the three observation cages 11 through 13. In the arrangement pursuant to FIG. 2, the lower observation cage serves for observation in Cassegrain focus with six and with eighteen mirrors. The middle observation cage 12 serves for observation in Cassegrain focus with six mirrors. The upper observation cage 13 serves for observation in prime focus and Cassegrain focus with eighteen mirrors. The different paths of the rays reflected from the eighteen mirror elements 2 are indicated by the edge rays in each case. FIG. 2 shows the parabolic shape of the primary mirror 1, which will be described below in greater detail, and also shows the latticed struts 14 between the intermediate support pipes 8 and the inner guide pipes 9, which will be described in greater detail below.

Figure 3:
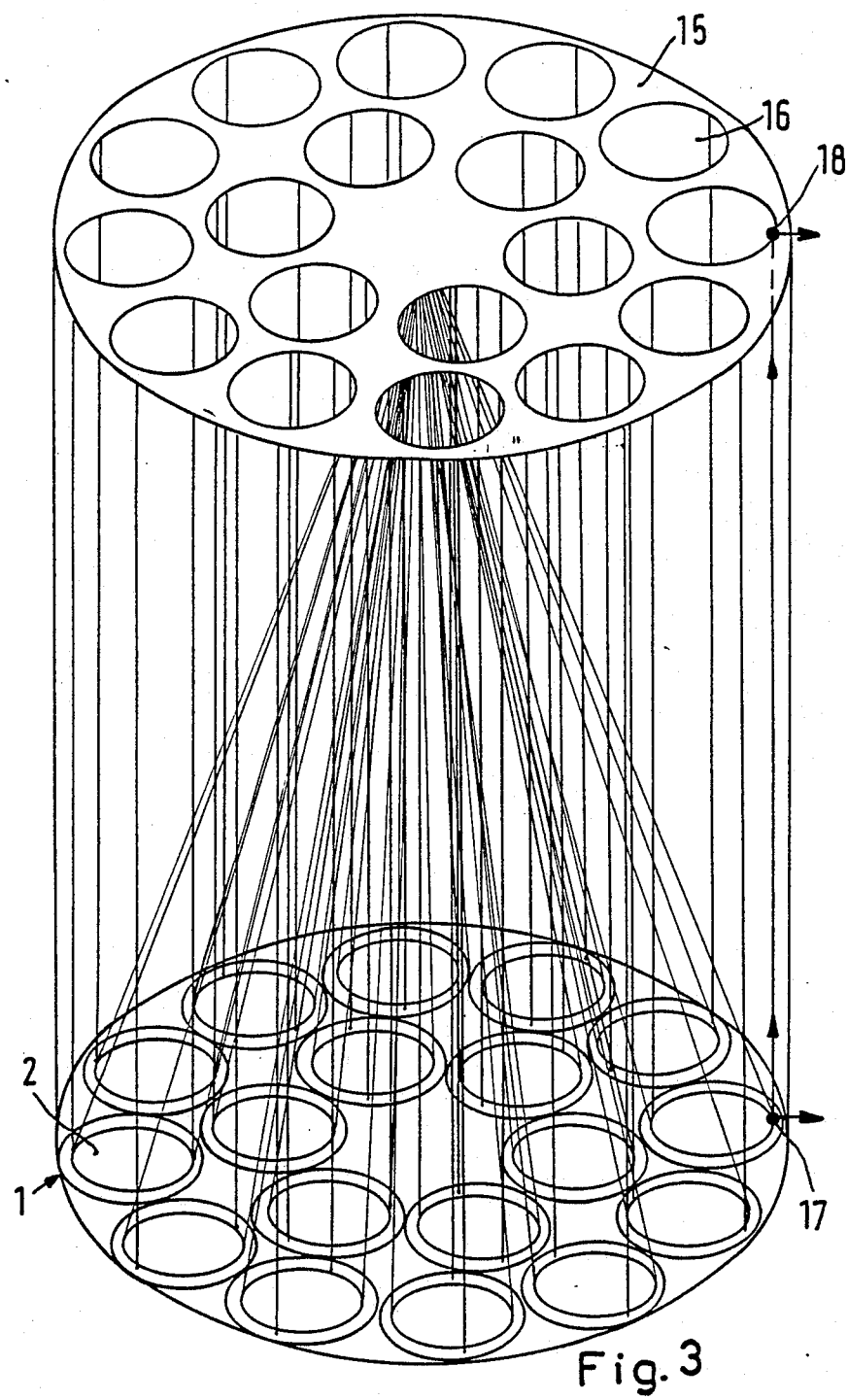
FIG. 3 is a perspective representation of the primary mirror to illustrate the adjustment of the individual round mirror elements by means of a laser pulse generator.

The position of the eighteen mirror elements 2 is adjusted pursuant to FIG. 3 by means of laser pulse generators 17, not shown in detail, that are so positioned on the edge of each of the mirror elements 2 that at the precise focus position they can emit pulses to receivers 18 situated vertically above them, mounted on a perforated plate 15, positioned at an inlet end of tube 110, with holes 16, and controlled by a computer. Any deviation in the position of the mirror element 2 from the previously determined position will be computed by the computer and immediately compensated for by the adjustable bearing 7 of each individual mirror element 2. It is helpful for the bearings 7 to be oil-hydraulic bearings, so that any necessary changes in position can also be performed by hydraulic means.

The bearings 7 of each separate mirror element 2 are not shown in detail in the drawings. Already known and tried bearings are suitable for the purpose, such as those used a number of times by the firm of Carl Zeiss in Oberkochen, the Federal Republic of Germany. Bearings of this kind have radial support systems with a pure compression-tension equilibrium. The individual bearing points are distributed over a hydraulic support system. Equilibration of the mirror is achieved by means of double hydraulic chambers.

The primary mirror 1 consisting of the 18 mirror elements 2 in the embodiment used as an example is ground pursuant to FIG. 4 by means of a guide block 19 positioned concentric to the central axis 3 of the primary mirror 1, on the inner side of which block slides a cradle 20 resting on a film of oil and attached to a radial arm 21 which is in turn mounted on the central axis 3. Along the radial arm 21, polishing/grinding spheres 22, equipped with their own rotational drive mechanisms, can travel radially. By means of this grinding arrangement, all eighteen mirror elements 2 can be ground and polished with precision to assume the desired paraboloid shape. The surface is tested in a manner not represented in detail by means of a zero-test laser interferometer, the prerequisite for which, of course, is that the individual mirror elements 2 are adjusted and positioned with respect to a common focal point of the primary mirror 1. This adjustment of position is done as depicted in FIG. 3 and described with reference to it.

The shape and grind of the individual mirror elements 2 are shown in FIG. 5a. As a result of the grinding proces described with reference to FIG. 4, the individual mirror elements 2 are not rotationally symmetrical in shape. Their surface curvature is part of the hypothetical large mirror in the form of the primary mirror 1 with a parabolic surface, the surface curvature of each of the mirror elements 2 forming a round section thereof. This yields a precise focal point on the central axis 3. In order to save on weight, the camber of the edges of the outer twelve mirror elements 2 can be minimized as shown in FIG. 5b.

Figure 6A:
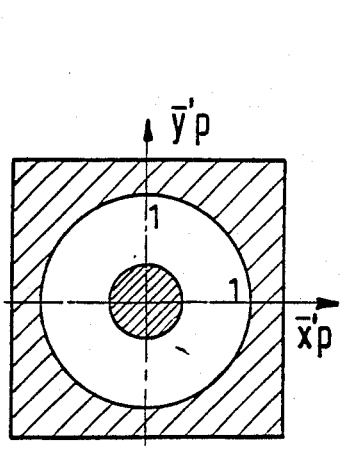
FIG. 6a 6b and 6c are functional diagrams.
Figure 6B:
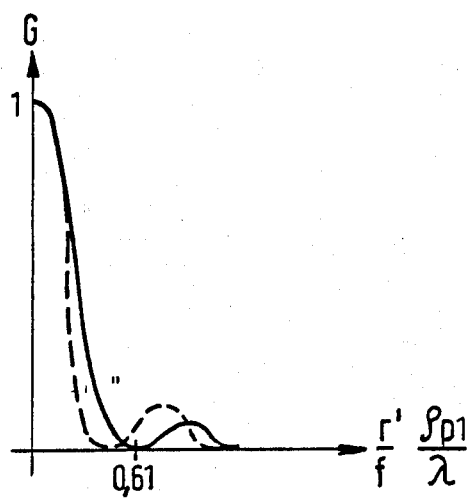
Figure 6C:
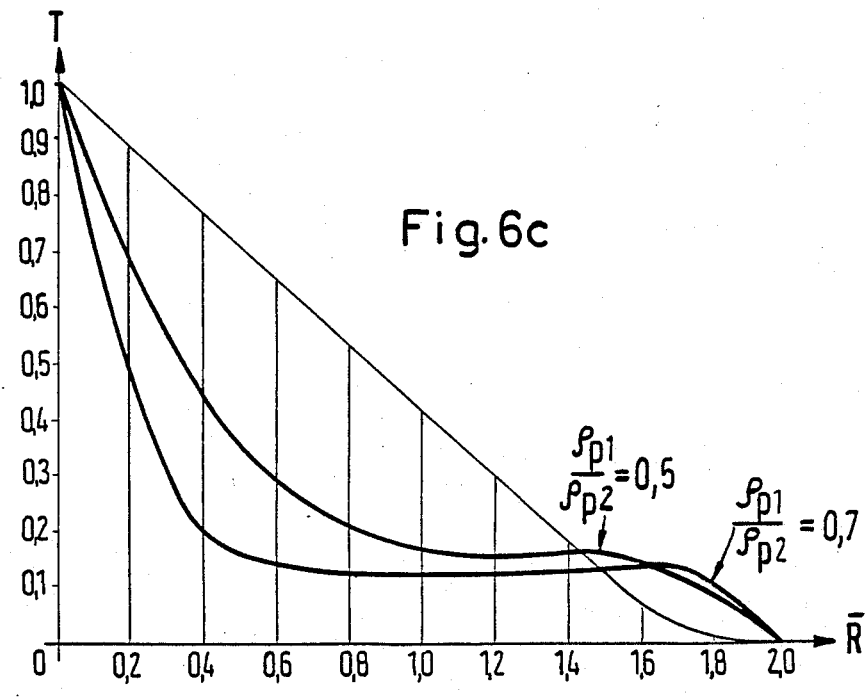

The various diagrams in FIG. 6 illustrate the effects of the central shadowed area, i.e., in the center of the primary mirror 1, where no mirror element 2 is positioned, as FIGS. 1 and 3 show. The central axis reflector as depicted and described improves resolution and at the same time reduces contrast at median spatial frequencies (FIG. 6a). The point-image function with central shadowing pursuant to the invention (dotted line in FIG. 6b) is improved over known point-image functions (FIG. 6b). Finally, the modulation transfer function is improved with central shadowing pursuant to the invention, as FIG. 6c shows.

FIGS. 7 through 10 are simplified representations of the path of the rays with different modes of observation.

Figure 7:
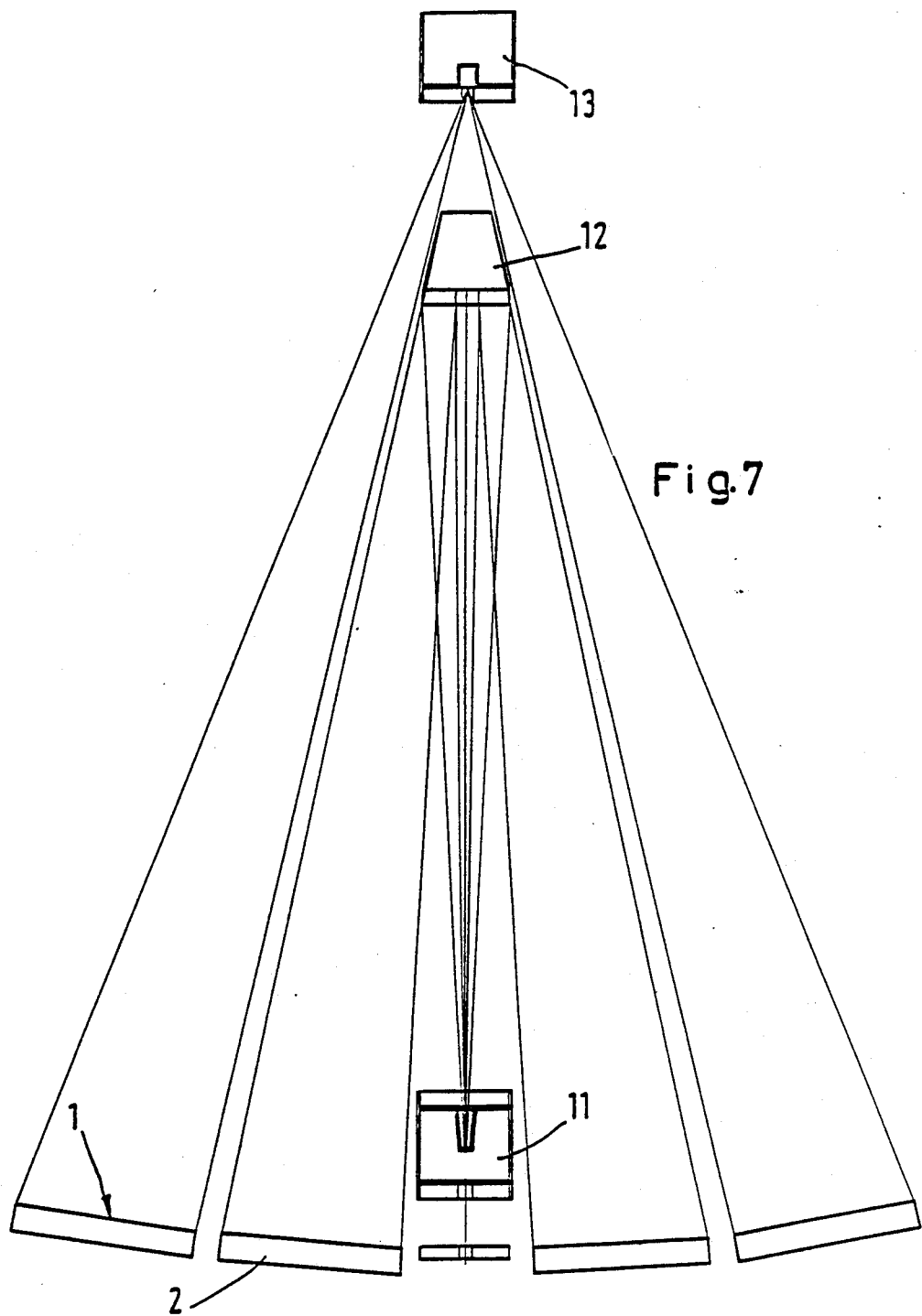
FIGS. 7 through 10 are simplified illustrations of the path of the rays with different systems of observation.

FIG. 7 illustrates prime focus with twelve mirror elements 2 with simultaneous Cassegrain focus with six mirrors 2. The position of the observation cages 11 through 13 corresponds to the position shown in FIG. 2.

Figure 8:
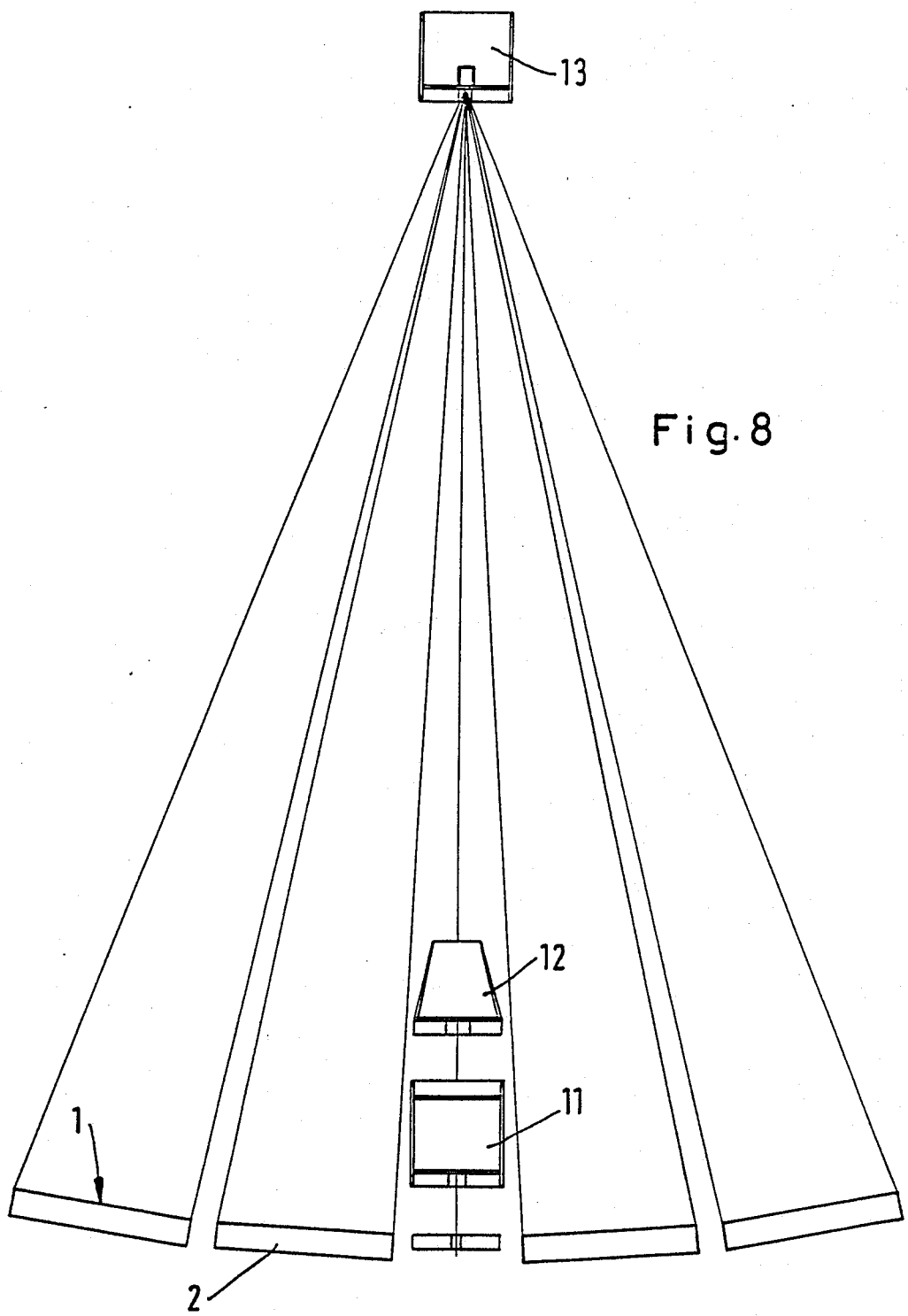

FIG. 8 illustrates prime focus with eighteen mirrors at the upper observation cage 13, with the other two observation cages 11 and 12 moved to the bottom and unused.

Figure 9:
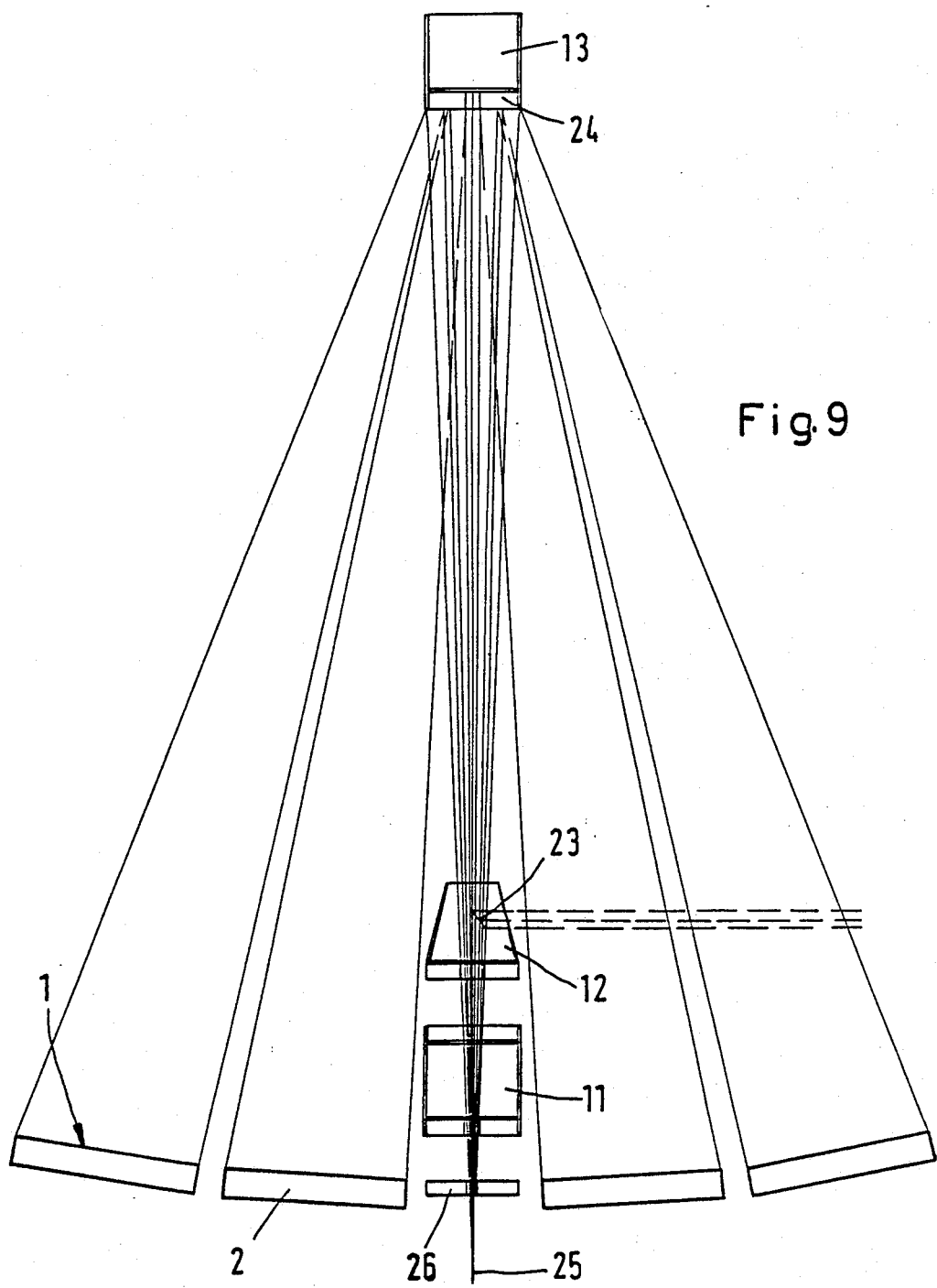

FIG. 9 illustrates Cassegrain focus with eighteen mirrors, together with a diversion option for Coudé focus which is provided by a secondary mirror 23 in the middle observation cage 12. The upper observation cage 13 has a secondary mirror 24 mounted underneath it. The eyepiece 25 for Cassegrain focus is shown underneath an aperture 26.

Figure 10:
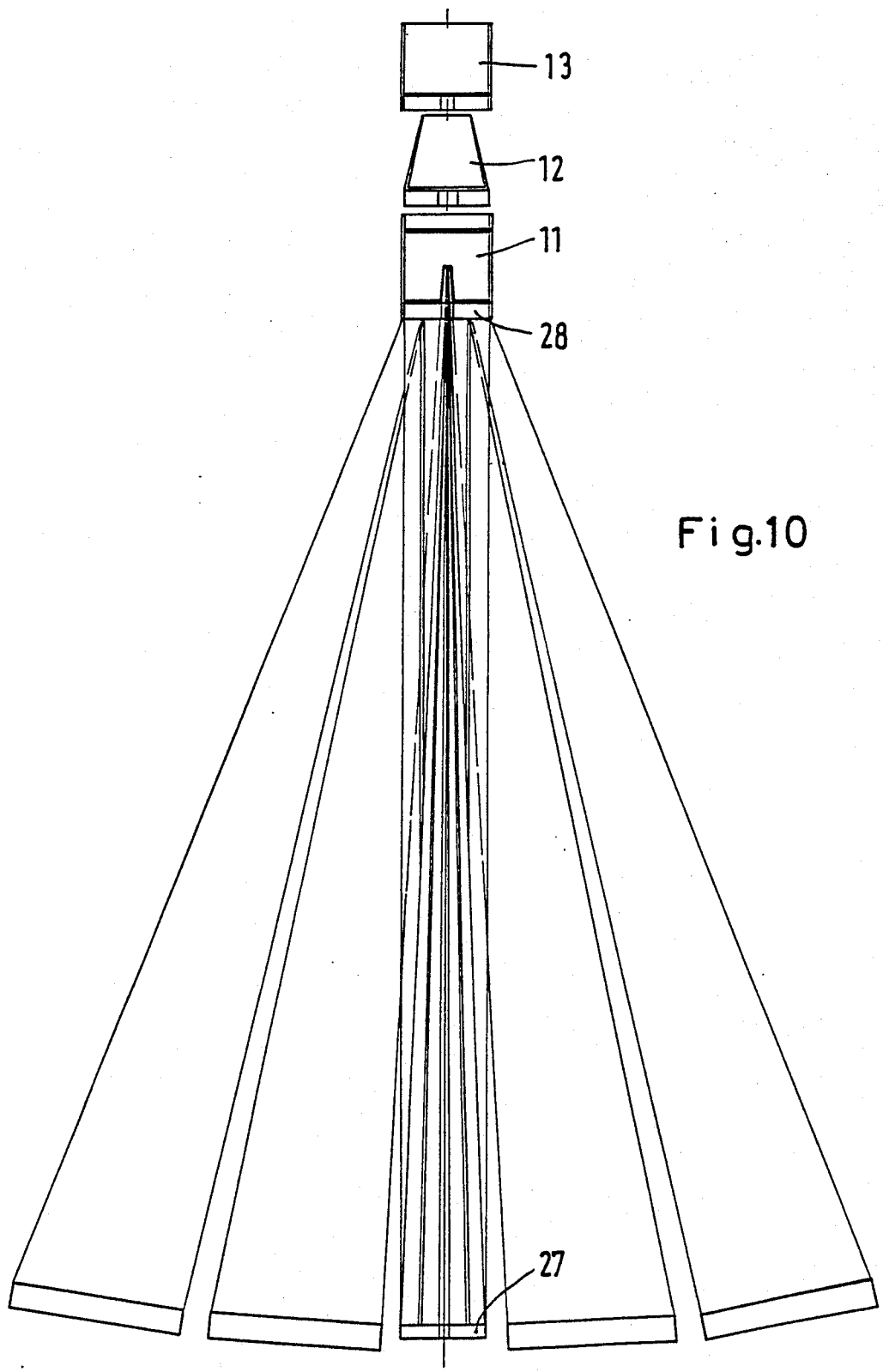

FIG. 10 illustrates Cassegrain focus with eighteen mirrors and triple reflection by means of two mirrors 27, 28 mounted on the aperture 26 and underneath the lower observation cage 11. The two upper observation cages 12 and 13 are inactive.

In FIGS. 7 through 10, in each case the edge rays from the various mirror elements 2 and secondary mirrors 23, 24 and 27, 28 are represented.

Figure 11:
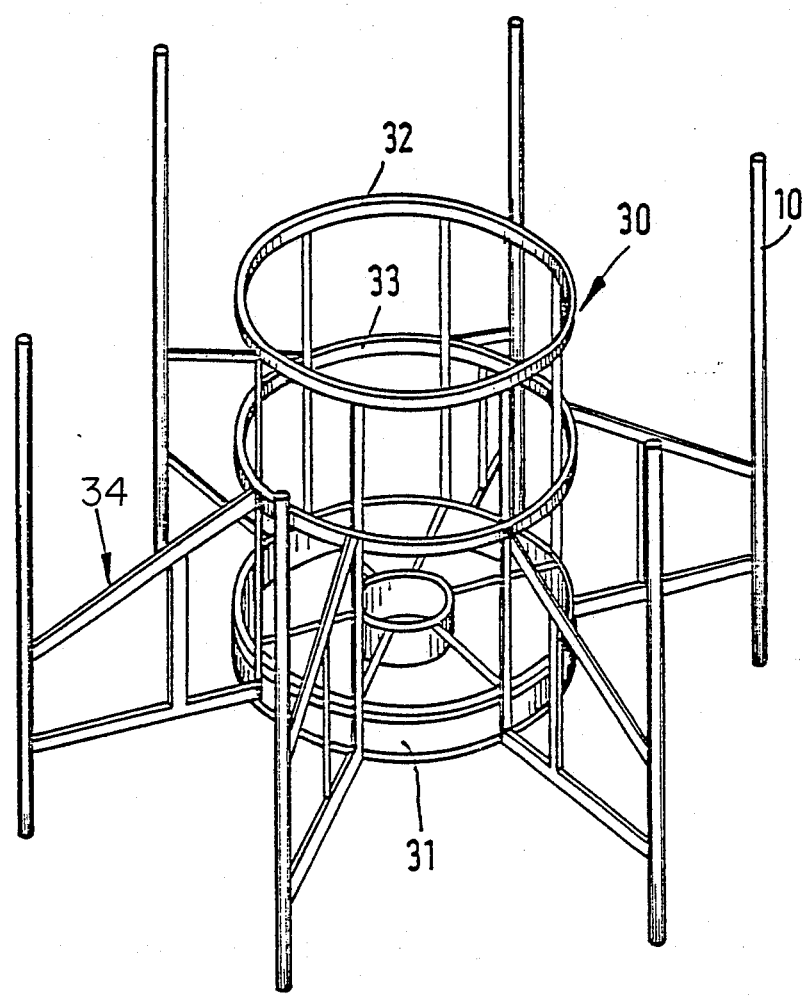
FIG. 11 is a perspective view of the system of mounting bars.

FIG. 11 illustrates the framework 30 for one of the observation cages 11 through 13, which consists of a platform 31 holding the secondary or deflection mirrors 23, 24 or 27, 28, two support rings 32, 33 mounted at intervals above the platform 31, and radial struts 34, which are mounted so as to be capable of vertical movement in the inner guide or slide rails 10.

Figure 12:
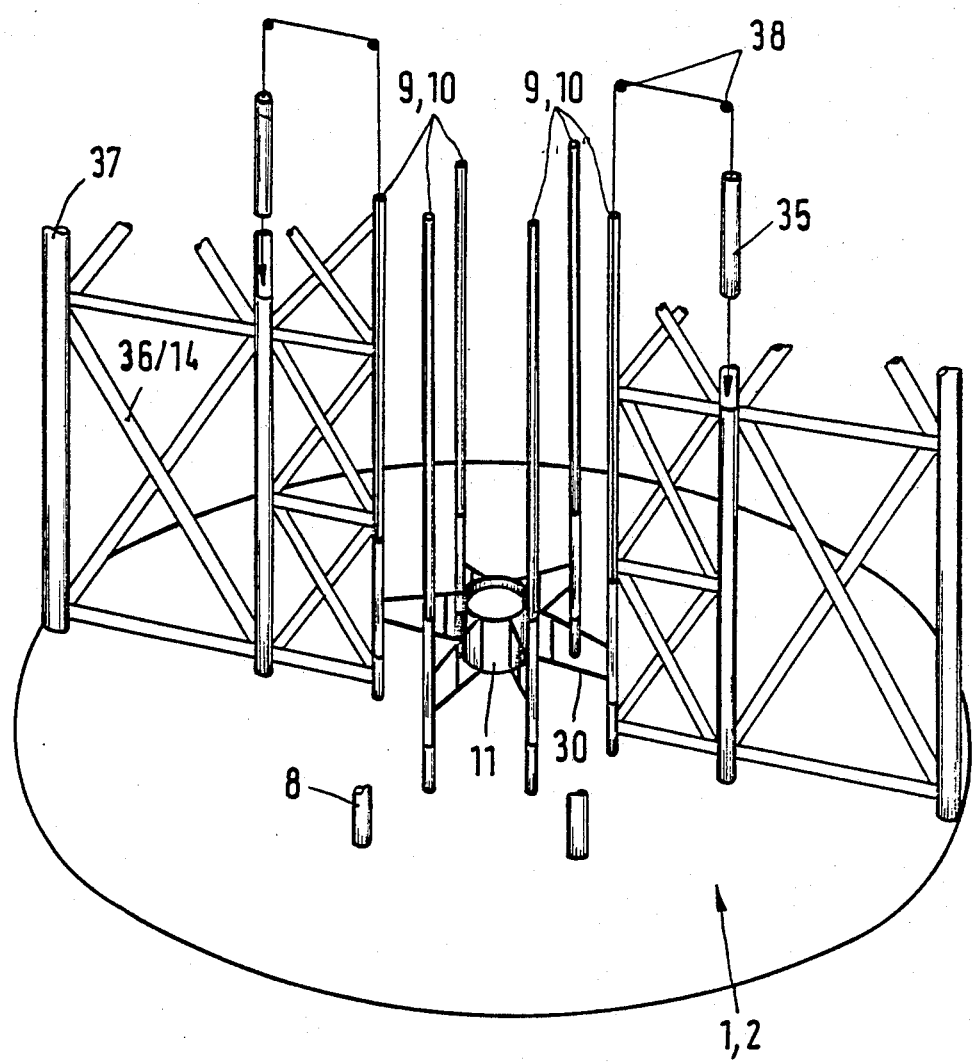
FIG. 12 is a perspective cutaway view showing further details of the mounting bars.

FIG. 12 shows in a partially cut-away perspective view the framework 30 fitted inside the central axis 3 of the primary mirror 1 with the guide/slide rails 10 of the inner guide pipe 9. The inner guide pipes 9 are supported via the latticed struts 14, acting as static connecting trusses, by the intermediate support pipes 8, in which are guided ballast members 35 to counteract the weight of the framework 30 of the three observation cages 11 through 13. The intermediate support pipes 8 are in turn supported via another lattice structure 36 by outer support pipes 37. The inner circular track is delimited on an inner side by an imaginary circle A, substantially coincident with frame work 30 and on an outer side by an imaginary circle B, intersecting slide rails 10. The six mirror elements 2 of the inner track are positioned within circles A and B. The outer circular track is delimited on an inner side by imaginary circle B and on an outer side the outer circular track is delimited by an imginary circle C intersecting support pipes 37. The twelve mirror elements 2 of the outer track are positioned between concentric circles B and C.

Figure 13:
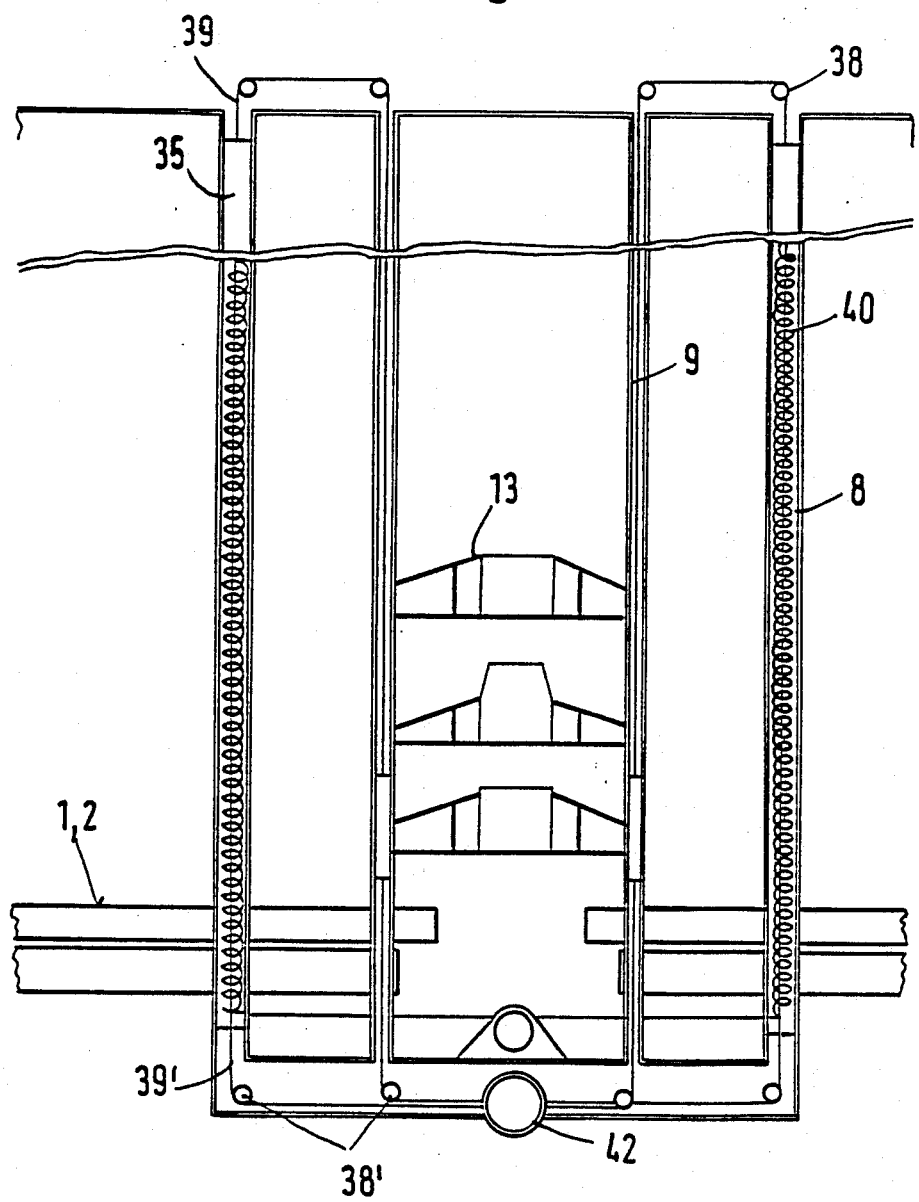
FIG. 13 is a sectional view along the central axis through the mounting bars.

FIG. 13 is a simplified representation of a vertical section through the mounting bars 6, showing the carrying cables 39 guided over deflection pulleys 38 that connect the ballast members 35 with the various observation cages 11 through 13. Guide cables 39' for the ballast members 35 are guided over lower deflection pulleys 38'.

Figure 14:
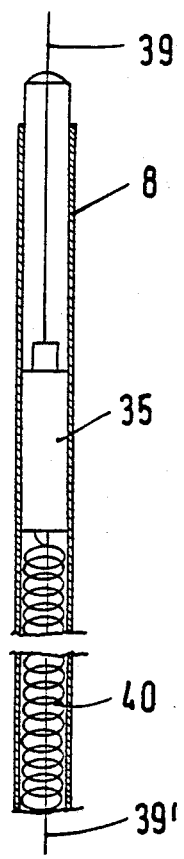
FIG. 14 is a longitudinal sectional view through a guide pipe.

As shown in FIG. 14, the ballast members 35 guided inside the intermediate support pipes 8 are designed as hollow elements and connected with hydraulic oil hoses 40 and via the latter with an oil pump 41, so that the weight of the ballast members 35 can be changed according to the load of the individual observation cages 11 through 13 for purposes of weight adjustment. The movement of the observation cages 11 through 13 is controlled by means of a central drive unit 42 in a manner not shown in detail.

The three observation cages 11 through 13 can thus be moved along the central axis 3, for which purpose the observation cages 11 through 13 are mounted on the six slide/guide rails 10. These slide rails 10 are mounted with minimal friction in the guide pipes 9. Each observation cage 11 through 13 is suspended on two opposite slide/guide rails 10. The two suspension mechanisms, acting independently of one another, for each observation cage 11 through 13 are guided in the corresponding intermediate support pipes 8 in such a way that the two ballast members 35 associated with each observation cage 11 through 13 balance the weight of the observation cage 11 through 13. Thus, each observation cage 11 through 13 is suspended in the slide rail bearing when the tube or system of mounting bars is in vertical position. Subsequent guiding of the observation cages 11 through 13 to a precise focus position is thereby made much easier.

Since a total of six intermediate support pipe 8 together with six guide pipes 9 are provided, the three observation cages 11 through 13 may be moved independently of one another. With a diameter of approx. 2.4 meters, each observation cage 11 through 13 has enough room to accommodate up to four astronomers making obervations. The differential loads thus experienced can be compensated for by filling the ballast members 35 with oil to the point where the observation cages 11 through 13 have reached their theoretical state of suspension. Precise control can then be accomplished automatically by means of load checking devices not depicted in detail.

The movement of the carrying cables 39 and guide cables 39' as traction cables is accomplished as shown in FIG. 13 within a closed system, where the central drive unit 42 has an electric motor not shown in detail that is located under the plane of the primary mirror 1. The carrying cables 39 are connected to the guide cables 39' by the ballast members 35 and attached within the guide pipes 9 from above or from below, respectively, with the corresponding observation cage 11 through 13 or the guide rails 10 associated with it. Thus, the observation cages 11 through 13 are centrally controlled from the central drive unit 42.

Figure 17:
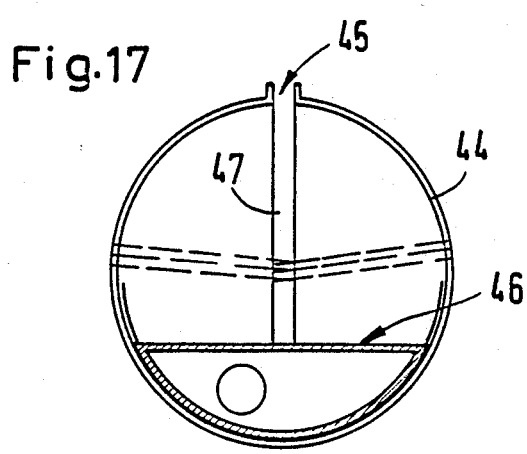
FIG. 17 is an axial sectional view through a Coude cage.
Figure 15:
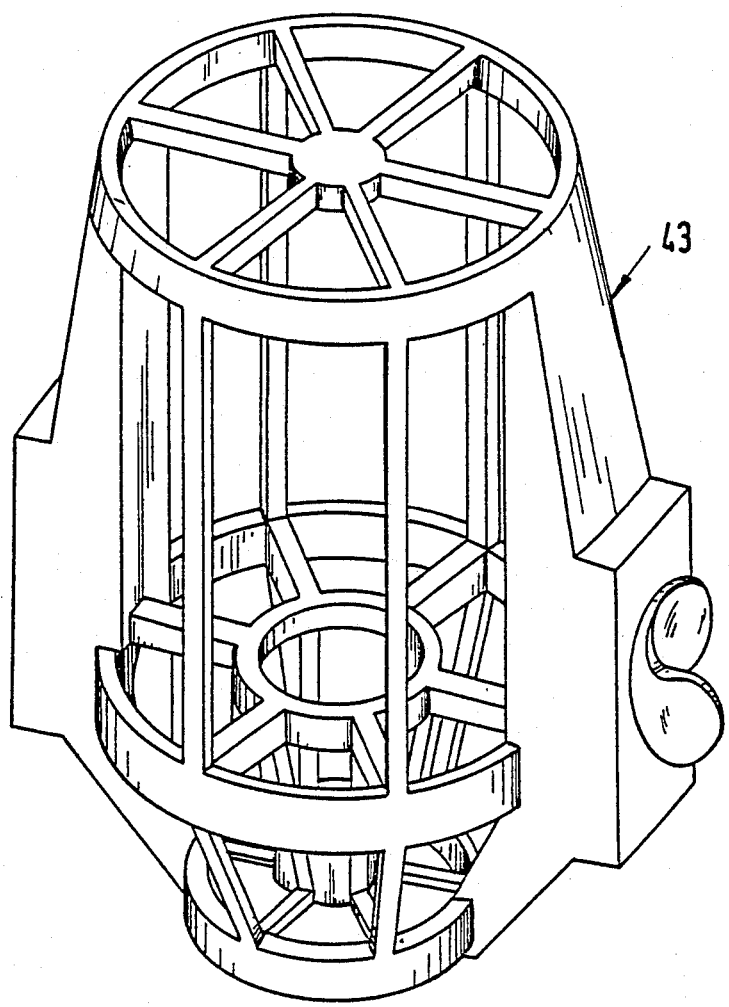
FIG. 15 is a perspective view depicting of the frame of the tube.
Figure 16:
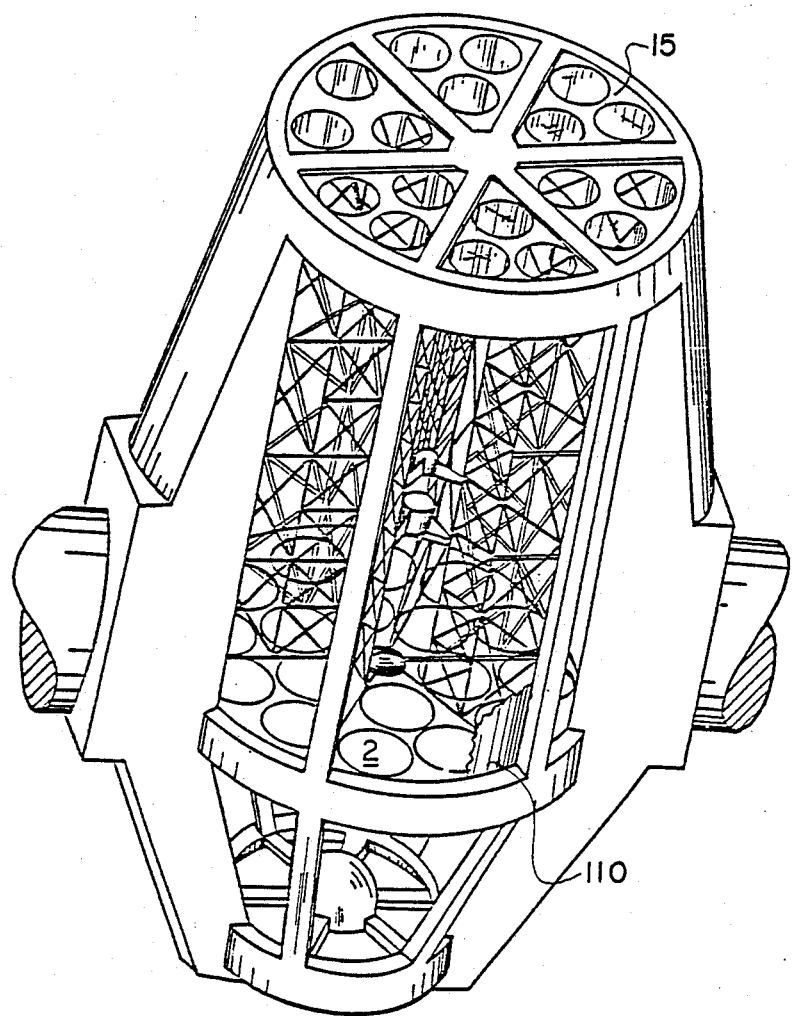
FIG. 16 is a perspective view of the fully assembled tube with frame, primary mirror and system of mounting bars.

FIGS. 15 and 16 are prespective representations of the frame 43 surrounding the tube 110 in which the primary mirror 1, the system of mounting bars 6 are situated in the frame 43 with observation cages 11 through 13 and the perforated plate 15 that closes off the tube 110 are inserted or set. On the bottom of the tube is a spherical observation booth 44 for the Coudé focus with a circular entry hatch 45, depicted in greater detail in FIG. 17. The observation booth 44 is rigidly connected to the tube. An inner platform 46 is mounted on a film of oil and hence with minimal friction and assumes a horizontal position regardless of the angle of the tube. Since the tracking movement of the tube proceeds relatively slowly, oscillations are practically ruled out. Air turbulence due to the intake of fresh air is thus not a matter of importance, because precautionary measures, such as sheathing the incident beam of light until it reaches the measuring instruments, can be worked into the design. Access to the spherical observation booth 44 is by an entry hatch 45 for the beam of light. Power lines are provided by pipe conduits, not depicted in detail, that are brought in parallel to the light-beam sheathing 47. The diameter of the round platform 46 of the observation sphere 44 is approx. 8 meters. Underneath the platform 46 there is thus adequate space inside the spherical housing wall for oil-hydraulic and attaching devices.

Figure 18:
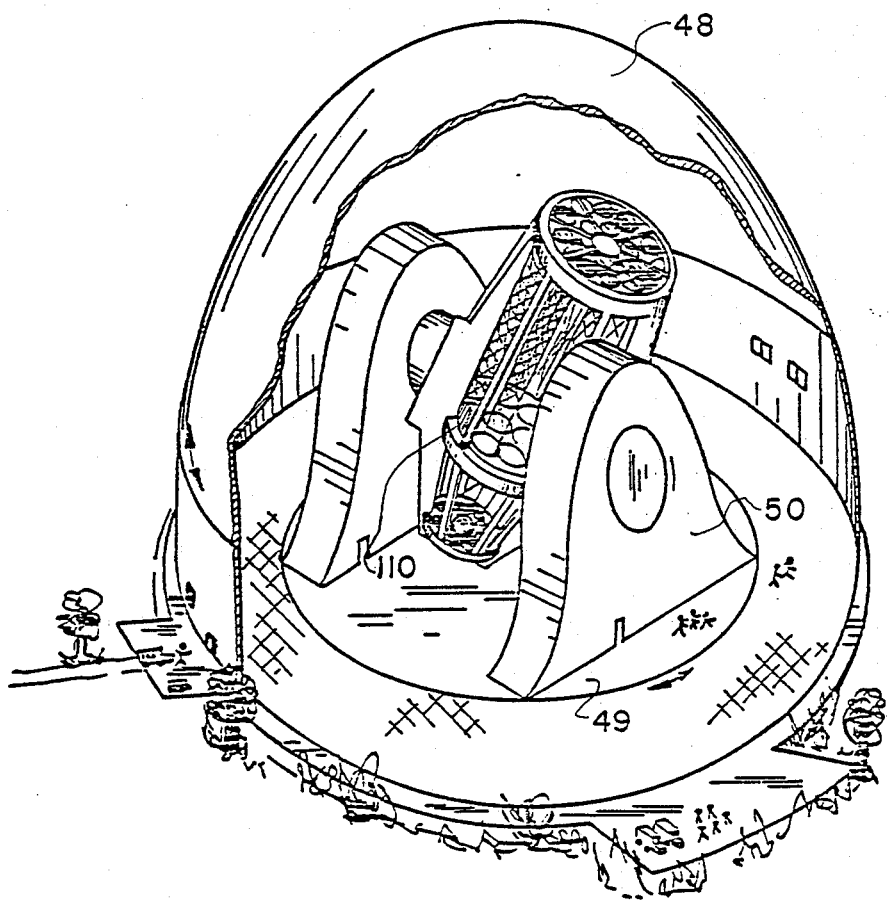
FIG. 18 is a partially cut-away perspective view of the completed telescope construction.

FIG. 18 shows the complete reflecting telescope, whose hemispherical roof 48 turns in conjunction with the circular base plate 49. This allows for very exact tracking. Access to the reflecting telescope is via the suspension supports 50. The total height of the dome is approximately 50 meters.

I claim:

1. A reflecting telescope comprising: a cylindrical tube having a inlet end and a primary mirror end, the tube having a central axis; a plurality of mirror segments cooperating to form a single mirror, said mirror segments forming a single paraboloid-shaped surface by grinding the mirror segments altogether in a single grinding process, said primary mirror of paraboloid shape being positioned at said primary mirror end of said tube, each of plurality of mirror segments having a circular disk shape and being arranged in circular tracks, each circular track being defined by an inner circle and an outer circle, each of said inner and outer circles being concentric to the tube central axis, areas free of mirror segments lying between said mirror segments of circular disk shape and an innermost area free of mirror segments lying within an innermost circular track, said mirror segments being mounted at said primary mirror end for individual adjustment; bearings positioned about each of said mirror segments at said areas free of mirror segments lying between said mirror segments, said bearings being adapted to adjust each of said mirror segments; a system of mounting bars positioned in said tube between said inlet end and said primary mirror end, said mounting bars being connected to said primary mirror end at said areas free of mirror segments, such that light entering said inlet end causes shadows to be cast by said system of mounting bars on said areas free of mirror segments; and, a plurality of observation cages, each of said plurality of observation cages being positioned in the innermost area free of mirror segments, each of said plurality of observation cages being positionable between said tube primary mirror end and said inlet end to provide different modes of observation, each of said observation cages including at least one deviating mirror for reflecting light which has been directed to it.

* * * * *